United States Patent [19]

Westphal et al.

[11] Patent Number: 4,860,016

[45] Date of Patent: Aug. 22, 1989

[54] TEST FACILITY, ESPECIALLY FOR THE SEARCH HEAD OF INTELLIGENT GUIDED AMMUNITION

[75] Inventors: Robert Westphal, Altdorf; Karl Herrmann, Eckental, both of Fed. Rep. of Germany

[73] Assignee: Diehl GmbH & Co., Nuremberg, Fed. Rep. of Germany

[21] Appl. No.: 108,780

[22] Filed: Oct. 14, 1987

[30] Foreign Application Priority Data

Oct. 31, 1986 [DE] Fed. Rep. of Germany ....... 3637000

[51] Int. Cl.[4] .......................... G01S 7/40; G09B 9/00
[52] U.S. Cl. ................................... 342/169; 342/165; 434/2
[58] Field of Search ................... 342/1, 169, 170, 165; 434/2; 244/3.16; 350/1.2, 1.4, 503, 504

[56] References Cited

U.S. PATENT DOCUMENTS

| | | | |
|---|---|---|---|
| 3,114,910 | 12/1963 | Rymes | 342/170 |
| 4,021,662 | 5/1977 | Mimms | 244/3.16 X |
| 4,467,327 | 8/1984 | Drake et al. | 434/2 X |
| 4,521,780 | 6/1985 | Priekshat | 342/170 |

Primary Examiner—Thomas H. Tarcza
Assistant Examiner—Gilberto Barrón, Jr.
Attorney, Agent, or Firm—Scully, Scott, Murphy & Presser

[57] ABSTRACT

A test facility, especially for the seeker or search heads of intelligent guided ammunition, including a target simulator for the reflection of a target signature through the intermediary of antenna elements towards the search head which is mounted on a turntable or rotary member with a flight simulator. Arranged between the target simulator and the search head is a quasi-optical coupling which follows the beam geometry by means of an imaging system and, on the one hand, the search head, as well as, on the other hand, the target simulator are located in or proximate to the applicable focal point of the resultingly produced path of transmission.

8 Claims, 1 Drawing Sheet

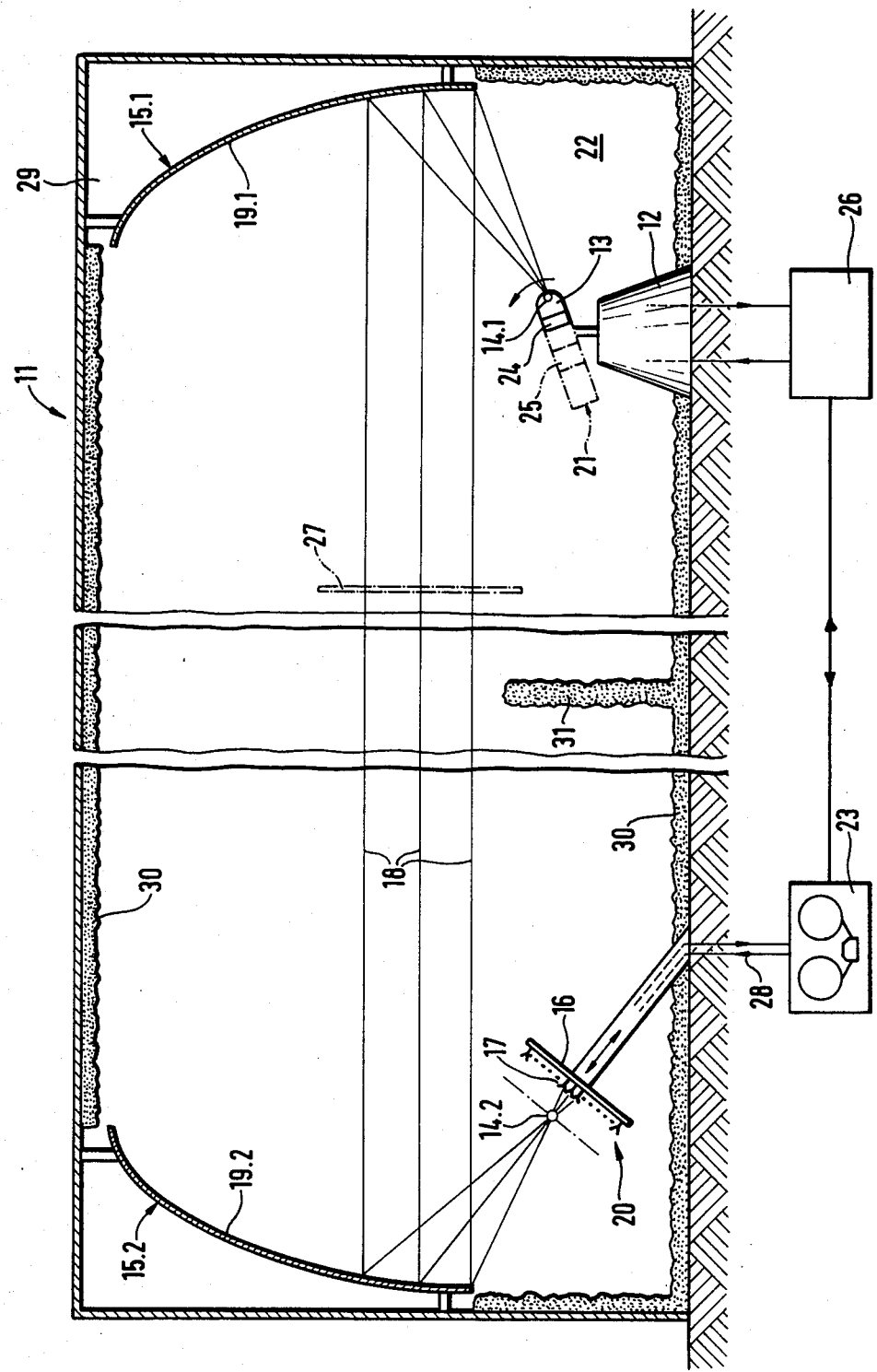

TEST FACILITY, ESPECIALLY FOR THE SEARCH HEAD OF INTELLIGENT GUIDED AMMUNITION

BACKGROUND OF THE INVENTION

1. Field of the Invention

The present invention relates to a test facility, especially for the search heads of intelligent guided ammunition, including a target simulator for the reflection of a target signature through the intermediary of antenna elements towards a search head which is mounted on a turntable or rotary member, the latter of which is operatively connected with a flight simulator.

2. Discussion of the Prior Art

A test facility of that type is currently known from the article "Hardware-in-the-Loop" Simulation from Mikrowellen Magazine, Vol. 11, No. 4, 1985, pages 406–408, especially referring to the center column on page 407; or from MSDH 1984, page 36, FIG. 22. In both instances, target simulators functioning as transponders are consitituted from a large array of antenna elements which are irradiated or reflected on from a search head which is located in front thereof positioned on a triaxial turntable; with the reflection of the absorbed energy after processing in a simulation computer, in order to simulate the target signatures which are to be processed by the search head in a clutter environment. In any event, the requirement on apparatus for an simulation-antenna installation is already enormous, not even mentioning the demands on hardware and software for the implementation of the actuation from the simultation computer. As a consequence thereof, only a relatively limited surface which is equipped with antenna elements is obtainable as the target simulator. However, this has as a result that only under an extremely narrow or small angle of traverse (in essence, unrealistically small in comparison with an actual scanning angle), will the antenna array of the target simulator be actually detected by the search head; whereas a close approach by the search head to the plane of the array constituted of antenna elements is not possible so as to enable an increase in the angle of detection inasmuch as the individual antenna elements which are then located under a wide angle cannot be picked up under the conditions of a remote radiation field, so that an evaluatable transponder response with a realistic target signature is no longer realizable. In effect, through external adjustments or interventions, it is possible to limit the scanning angle of the search head (essentially, the scanning movement of its antenna) to an angle, within which there will no longer be left the antenna array of the target simulator in the remote radiation field. However, the necessary interventions into the functioning of the search head and its signal processing installation, as well as into the functioning of the flight regulator of a guided ammunition which is equipped with the search head, such that it then actually no longer pertains to realistic test conditions; in effect; does not pertain any longer to the so-called "Hardware-in-the-Loop" operation, the test results are, in essence, no longer quite definitive with any degree certainty over the behavior of the guided ammunition under real field conditions. Moreover, for a target simulation which is obtainable through such a wall of antennas, irrespective of the exceedingly restricted operating angle, the degree of resolution is not sufficient adequate to be able to guide the movement of a guided ammunition upon homing onto the tracked target; namely, to be able to realize the slight line-turning rate during the collision course navigation over the entire approach sequence; which is, however, necessary in order to be able to prove the operational reliability of the autopilot in the target tracking-flight regulator. For this purpose, the real aspect angle, such as is encountered under sight line-rotational effects, allows itself to be simulated in that a robotic manipulating apparatus pivots a corner reflector along corresponding spatial paths of movement relative to the search head; however, which will not allow then for the concurrent evaluation of realistic target area radiation (in effect, the testing of recognition algorithms which are to be applied to the target signature).

SUMMARY OF THE INVENTION

In recognition of these conditions, which currently extensively limit the attainable capabilities of reliable operational tests on search heads for guided ammunition, or respectively, guided ammunition equipped with search heads, it is an object of the present invention to provide a test facility of the above-mentioned type which, within the broadest range and without any restrictions in functioning with respect to the mode of operation of the search head, can nevertheless be inexpensively produced, and in the interest of an expedient utilization, also open the possbilities of application to other testing tasks.

The foregoing object is inventively achieved in that the above-mentioned inventive test facility has the target simulator and the search head presently arranged in at least a close proximity to the focal point of a quasi-optical imaging system.

In accordance with the foregoing, the inventive object is predicated on the recognition that, for the movement of the search head, it is possible to implement extremely wide and thereby all practical angular movements which are of interest without the loss of the initially detected simulated target, when a quasi-optical coupling is effectuated between the target simulator and the search head, which follows the beam geometry through an imaging system, while, on the one hand, the search head, as well as on the other hand, the target simulator are located in or in proximity with the applicable focal point of the resultingly produced path of transmission. As a result thereof, there is eliminated not only the angular restriction during radiation or reflection against an antenna wall, but also the need for immense expenditures for a synthetic antenna installation (which still would not permit for the implementation of all flight-phase functions). Hereby, the geometric radiation coupling can be realized through the intermediary of an imaging system in the type of two focussing lenses, or through a still simpler kind of apparatus in the type of two parabolic or elliptical concave reflectors (commonly known as microwave-directional radio- beacon reflectors).

This test facility can be designed in the same manner for operation in the radiation energy in the microwave range or in the infrared range, and can be employed in conjunction with active, as well as with passive search heads. For the introduction of the target signature into the target simulator (in effect, for the modulation of the received energy by the active search head, or for the excitation of a passive search head), utilization can be made of measured or synthetically generated target and clutter signatures, for instance, such as are described in German Laid-Open Patent Appln. 34 34 326.

However, the same test facility can also be employed without any operation of the target simulator, in order to be able to measure the antenna chracteristics of a search head in the path of the parallel beams between the two elements of the quasi-optical imaging system.

BRIEF DESCRIPTION OF THE DRAWING

Additional alternatives and modifications, as well as further features and advantages of the invention can now be readily ascertained from the following detailed description of an exemplary embodiment of the invention, taken in conjunction with the accompanying single figure of drawing, illustrating in a generally diagrammatic vertical section through the focal points of an imaging system, the arrangement of a search head in relation to a target simulator.

DETAILED DESCRIPTION

The test facility 11 is essentially constituted of a triaxial turntable or motion simulator 12 for the spatially displaceable retention of a search head 13 within the focal point 14.1 of a first element of a quasi-optical imaging system 15.1, and of a support 16 for at least one antenna element 17 in proximity to the focal point 14.2 of a second element of the quasi-optical imaging system 15.2. A radiation-geomtric coupling exists between the two elements of the imaging system 15.1 and 15.2 through intermediary of parallel rays or beams 18. In the preferred exemplary embodiment, as illustrated, the imaging system 15 relates to two mutually oppposingly arranged concave parabolic reflectors 19.1 and 19.2 with, respectively, eccentric focal points 14.1 and 14.2, and which possess good reflective properties for the herein considered frequency range from the spectrum of the electromagnetic radiation, thus, for example, for radar radiation in the gigahertz-frequency range or for infrared radiation; in conformance with the operating mode of the search head 13 which is to be tested.

By the search head 13 there is detected the first concave reflector 19.1 in practically every spatial position thereof which to be realistically taken into consideration, and thereby, on the basis of the radiation geometry, by means the second concave reflector 19.2, also presently at least the central antenna element 17 of the target simulator 20 which is located within or behind the focal point 14.1. In conformance with the realistic conditions which are encountered during the phase of searching for a target in the deployment of such a search head 13 in guided ammunition 21, notwithstanding the only finite dimensions of the target simulator 20, there are not encountered any gaps in the viewing field of the search head 13; in essence, it will not again lose the target which is represented by the simulator 20 after the target has been once acquired; for instance, through pivoting of the direction of action of the search head 13 from a non-reflective spatial sector 22 into the reflective surface of the first concave reflector 19.1.

The exemplary embodiment considered herein pertains to an active search head 13 which, in a practical case of utilization, employs electromagnetic energy for the scanning of a target area (represented by the spatial sector 22 and the adjacent surface of the concave reflector 19.1) to search for a target object onto which it is to be homed, whereby from the latter and from its surroundings there is reflected radiation energy which is emitted from the search head 13 and which is again received by the search head 13. In order to simulate this sequence, there is received in the test facility 11 by means of the antenna element 17 the electromagnetic energy which is emitted by the search head 13 and which is coupled in through the beams 18, modulated in a simulation computer 23 with typical signatures of target classes which come into consideration and with unavoidable clutter influences, and with a delay in time which corresponds to a realistic instantaneous distance of the search head 23 from the target object, retransmitted by the concave reflector 19 to a receiver device in the search head 13, so as to be analyzed in the signal processing installation 24 thereof, and to be able to be evaluated for the influencing of a target tracking-flight regulator 25. The control parameters resulting therefrom for influencing the momentary flight position or trajectory of the guided ammunition 21 are transmitted to a flight simulator 26 for the actuation of the motion simulator 12; in effect, for the spatial change in the orientation of the search head 13, such that the search head 13 will realistically react in response to the momentary target information obtained from the target simulator, and that there can be registered and evaluated any malfunctions, for example, by means of suitable measuring apparatus (not shown in the drawing) which are connected thereto.

In the drawing, the guided ammunition 21, together with its flight regulator 25, is illustrated only through dot-dash lines, in order to emphasize that the test facility 11 can also be equipped for the testing of only the search head 13 per se (in essence, without the overall system of homing onto the target by means of guided ammunition), for example, through a test receiver device 27 which is displaceable in a plane transverse of the parallel rays or beams 18, in order to measure the antenna characteristics of the search head 13.

In order to simulate a target, whose characteristic reflector component (for an active search head 13) or irradiator component (for a passive search head 13, such an an infrared search head, or a radiometric search head) are staggered in depth, only the applicable portion of the target signature 28 which is delivered by the simulation computer 23 need be mixed into the information which reflected with a delay in time from the antenna element 17, and which allows for a wider scope of variation than would a spatial displacement of the antenna element along the direction of the beam from the focal point 14.2. However, when consideration is to be given to characteristics which are present at the target simulator 20, which are staggered in width or transversely, then as illustrated in the drawing, the support 16 is to be displaced relative to the focal point 14.2 and equipped with a multiplicity of antenna elements 17 which, in accordance with the geometric beam conditions, are thereby concurrently detected by the search head 13.

A displacement of the target aspect is possible in the same measure through a displacement of the support 16, as well as through a corresponding timewise staggering in the supplying of its individual antenna elements 17 from the simulation computer 23 with applicable parts of the overall target signature, so as to be able to thereby investigate whether the signal processing device 24 of the search head 13 will also ensure the tracking of a traget which is of interest under even unfavorable approach angles.

Basically, the test facilitating 11, with the detection of the target simulator 20 operating as a transponder by the search head 13 through the intermediary of an imaging system constituted, for example, of two concave reflectors 19, can operate in the open. However, in order to be able to inhibit the effects of any influences of the environment or surroundings which would disturb the geometry of the radiation on the mirror 19, as well as any disruptive incident radiation or reflections, and to be able to implement tests on search heads under reproduceably predetermined atmospheric conditions, it is expedient, as is considered in the drawing, that the two concave reflectors 19.1, 19.2, or preferably the entire test facility 11, in essence, inclusive the coupling provided through the parallel beams 18 between the reflectors 19, be installed in a closed chamber 29. The chamber, in all critical areas thereof, is equipped with absorbers 30 in order to avoid distortions or falsifications at the receiver on the part of the antenna elements and at the search head 13 caused by scattered or stray radiation reflections. Expediently, an absorber barrier 31 is additionally arranged between the motion simulator 12 and the target simulator 20 in order to hereby inhibit any direct coupling between scattered or stray radiation.

What is claimed is:

1. A test facility for search heads of intelligent guided ammunition, comprising a target simulator; a turntable with a flight simulator; a search head supported on said turntable, said target simulator including at least one antenna element for radiating a target signature to said search head; and a quasi-opical imaging system including two mutually facing concave reflectors each with an eccentrically located focal point, a coupling being formed between said focal points through parallel beams; said target simulator and said search head each being in at least close proximity with a respective one of said focal points.

2. A test facility as claimed in claim 1, wherein said target simulator includes said antenna element near the location of the focal point of the imaging system which is proximate said target simulator.

3. A test facility as claimed in claim 1, wherein said target simulator includes a plurality of mutually offset of said antenna elements.

4. A test facility as claimed in claim 1, wherein said target simulator is adjustable in different positions and orientations relative to the focal point of said imaging system which is proximate said target simulator.

5. A test facility as claimed in claim 1, including a closed chamber; absorber material lining the interior of said chamber, at least each said concave reflector being arranged within said chamber.

6. A test facility as claimed in claim 5, wherein said test facility is arranged in its entirety within said closed chamber, and an absorber barrier is located intermediate the target simulator and the turntable.

7. A test facility as claimed in claim 1, wherein the target simulator is selectively operable as a transmitter for a passively operating search head or as a transponder for an actively operating search head.

8. A test facility as claimed in claim 1, including test receiver means adjustable in the imaging system transversely of the ray path of the parallel beams.

* * * * *